No. 665,349. Patented Jan. 1, 1901.
T. SEWALL.
INSULATING RECEPTACLE FOR HOLDING LIQUID AIR.
(Application filed June 16, 1899.)
(No Model.)
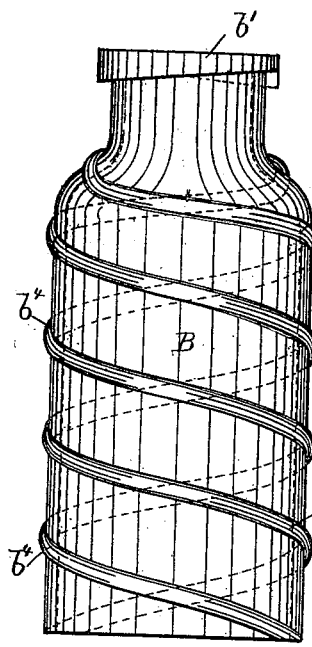
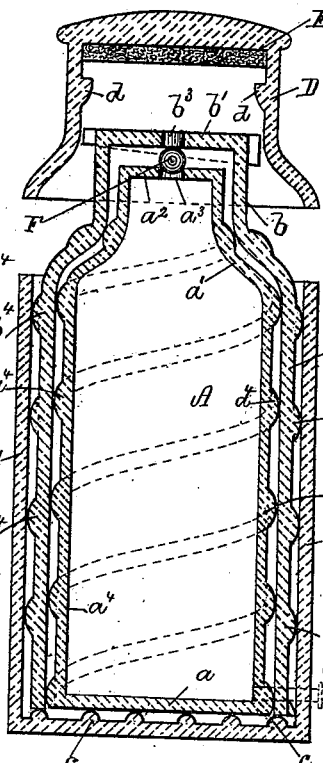
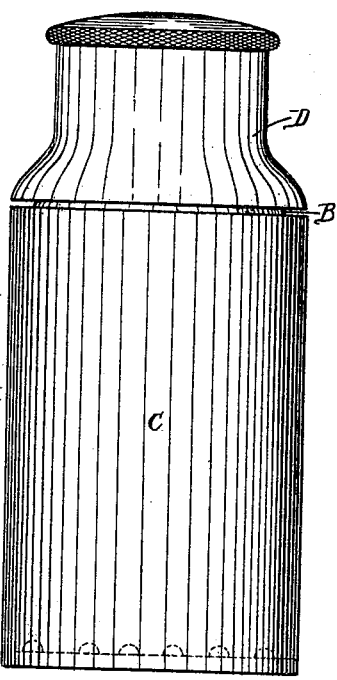
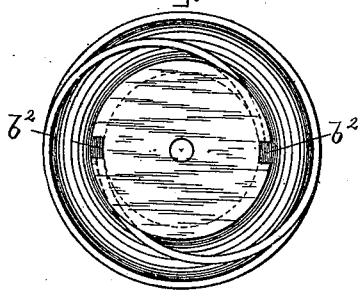
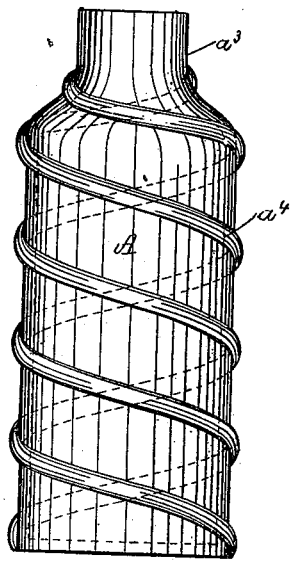
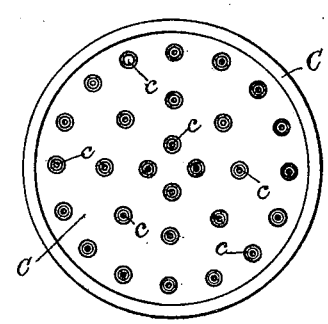
Witnesses.
Lauritz N. Möller
Mary C. Möller
Inventor
Thomas Sewall
by Edwin Planta
Attorney.

UNITED STATES PATENT OFFICE.

THOMAS SEWALL, OF BOSTON, MASSACHUSETTS.

INSULATING-RECEPTACLE FOR HOLDING LIQUID AIR.

SPECIFICATION forming part of Letters Patent No. 665,349, dated January 1, 1901.

Application filed June 16, 1899. Serial No. 720,744. (No model.)

*To all whom it may concern:*

Be it known that I, THOMAS SEWALL, a citizen of the United States, and a resident of Boston, in the county of Suffolk and State of Massachusetts, have invented certain new and useful Improvements in Insulating Receptacles for Holding Liquid Air, of which the following is a specification.

The object of my invention is to produce an insulating vessel or receptacle for containing liquid air and causing the vapor or gas arising from said liquid in the vessel or receptacle to circulate around the outside of said vessel, thus maintaining a low temperature within and around same to reduce the vaporization to a minimum.

The invention consists of a vessel or receptacle closed at the bottom and also at the top, except for a small central opening, the outside of said vessel being formed with ribs or other protuberances, preferably in spiral form, extending from the top to the bottom, so as to cause the vapor or gas escaping from the vessel to circulate around same, said vessel being inclosed within a casing having an open bottom and a top having a small central opening, said casing being formed on its outer surface with spiral ribs or other protuberances that cause the vapor or gas to ascend in an upward direction, said casing being inclosed within an outer casing having a solid bottom formed with a number of small knobs or protuberances upon which the bottom of the inner vessel and the inner casing rests, so as to form a passage for the vapor or gas, and a cover for inclosing the upper portion of the apparatus, as hereinafter set forth.

Referring to the accompanying drawings, Figure 1 represents a vertical section taken through a liquid-air vessel or receptacle embodying my invention. Fig. 2 is an elevation of the same with the cover in the closed position. Fig. 3 is an elevation of the vessel or receptacle for containing the liquid air. Fig. 4 is an elevation of the casing inclosing the liquid-air vessel. Fig. 5 is a plan or top view of same. Fig. 6 is a plan view of the outer casing.

A represents the vessel or receptacle in which the liquid air is placed. This vessel has a solid bottom $a$ and at its upper end is contracted to form a neck $a'$, closed at its upper end by a disk $a^2$, in which a small hole $a^3$ is formed. The outer periphery of the vessel is formed with spiral ribs $a^4$, or, if desired, vertical ribs or other protuberances or any other means for forming a passage might be employed in order to allow the vapor escaping from the vessel to circulate around same.

B is a casing the internal diameter of which is of a size to admit the vessel or receptacle A, and it is also formed with a neck $b$, closed at its upper end by a disk $b'$, the edges of which project beyond the neck $b$, so as to form a flange, in which are formed two recesses $b^2$, said flanges being beveled on their under side for the purpose hereinafter described. This disk is also formed with a small hole $b^3$, and around the body of this casing are arranged spiral ribs $b^4$ or vertical ribs, or other protuberances may be employed, if desired.

C is an outer casing open at the top and having small knobs or protuberances $c$ on the inside of the bottom, upon which rest the lower ends of the vessel A and casing B.

D is a cover of a form to fit over the neck of the casing B and open at its lower end and of a diameter equal to the diameter of the outer casing $c$. The inner surface of this cover is formed with two projections $d$ of a width to fit into the recesses or spaces $b^2$, and in the upper portion, above said projections, is arranged a disk, of felt E or other soft material, so that when the cover is placed in position the two projections $d$ pass to the under side of the flanges $b'$, and by giving the cover a slight turn the cover is, by the bevel of the flanges, drawn down, so that the felt E fits tightly upon the disk $b'$, thus closing the opening $b^3$, while the bottom of the cover will be held a short distance above the upper edge of the outer casing C, as shown in Fig. 2.

When in use, liquid air is placed in the vessel or receptacle A, and as the same vaporizes the vapor passes out of the opening $a^3$ into the space between the outside of the vessel A and the inner side of the casing B and is, by the spiral ribs $a^4$, conducted to the bottom and then passes up the space between the casing B and the outer casing, it ascending in spiral form by means of the ribs $b^4$. Then the vapor passes into the cover and escapes out of the space between the top of the outer casing B and the lower edge of the cover D. It will be seen that the vapor from the liquid air being conducted around the vessel A and casing B in the manner described the vapor is constantly expanding, consequently creating intense cold, thus assisting in keeping the liquid air in a cold condition.

I also provide an automatic valve, consisting of a small ball arranged to cover the opening $a^3$ in the top of the vessel A, so that the vapor will only escape out of the vessel A when it has reached a certain pressure.

As above stated, when the cover is secured so that the felt E closes the opening $b^3$ the gas or vapor (when of sufficient pressure to lift the ball-valve) can escape only by passing down between the inner vessel and the inner casing and then upward between the inner casing and the outer casing. If the cover is removed, however, some or a suitable portion of the gas or vapor may escape directly through the opening $b^3$, so as to more quickly reduce the temperature of the room in which the container may be placed, the gas or vapor thus having two escape-passages when the cover is removed, since the ball-valve cannot be lifted by the said gas or vapor sufficiently to close the opening $b^3$.

Of course ribs or other protuberances might be arranged on the inner side of both the casing B and the outer casing C, or something placed between them to form a passage, in which case the ribs on the outer surface of the vessel or receptacle A would not be required; but the action would be the same.

If desired, a pipe and faucet may be inserted at the lower end of the vessel, so that the liquid air may be drawn off, if required.

What I claim is—

1. A liquefied-air container comprising an inner vessel having an opening in its top and adapted to hold liquid air, a casing surrounding said inner vessel and separated therefrom to permit of the circulation of vapor arising from the liquid in the inner vessel entirely around the walls thereof, and an outer casing surrounding the first-mentioned casing, means being provided to permit of the escape of vapor to the space between the two casings after its escape from between the inner vessel and the first-mentioned casing, and a cover adapted to permit of the escape of the vapor between its lower edge and the upper edge of the outer casing.

2. An insulating vessel or receptacle for containing liquid air, a small opening at the top of same for the escape of the vapor, spiral ribs around the outside of said vessel, a casing around same having spiral ribs on its outer surface, and an outer casing having small knobs or protuberances on the inner side of its bottom whereby a circulation of vapor is maintained around the vessel containing the liquid air, substantially as set forth.

3. A liquid-air container consisting of a vessel or receptacle for holding liquid air, and a casing therefor having a disk at its upper end formed integral therewith with a small central hole, the disk having a projecting lip forming flanges, beveled on their under sides and having notches, in combination with a cover having near its upper end lugs on its inner side, to correspond with the notches in the edge of the flange of the disk on the upper end of the vessel the said cover being adapted to prevent the escape of vapor through the hole at the upper end of the casing, so as to insure that the vapor will pass below the lower edge of the casing, as set forth.

4. A liquid-air container consisting of a vessel or receptacle for holding liquid air, and a casing therefor having its upper end provided with a central opening, in combination with a cover adapted to prevent the escape of vapor through the opening at the upper end of the casing so as to insure that the vapor will pass below the lower edge of the casing, whereby the presence or absence of the cover will confine the escape of vapor to the space between the receptacle and the casing or will permit it to escape through the opening in the casing as well as through said space.

In testimony whereof I have affixed my signature in presence of two witnesses.

THOMAS SEWALL.

Witnesses:
  CHAS. STEERE,
  EDWIN PLANTA.